Oct. 27, 1936.  G. W. HULSHIZER  2,058,988
CHUCK MECHANISM FOR ROCK DRILLS
Filed Nov. 15, 1934
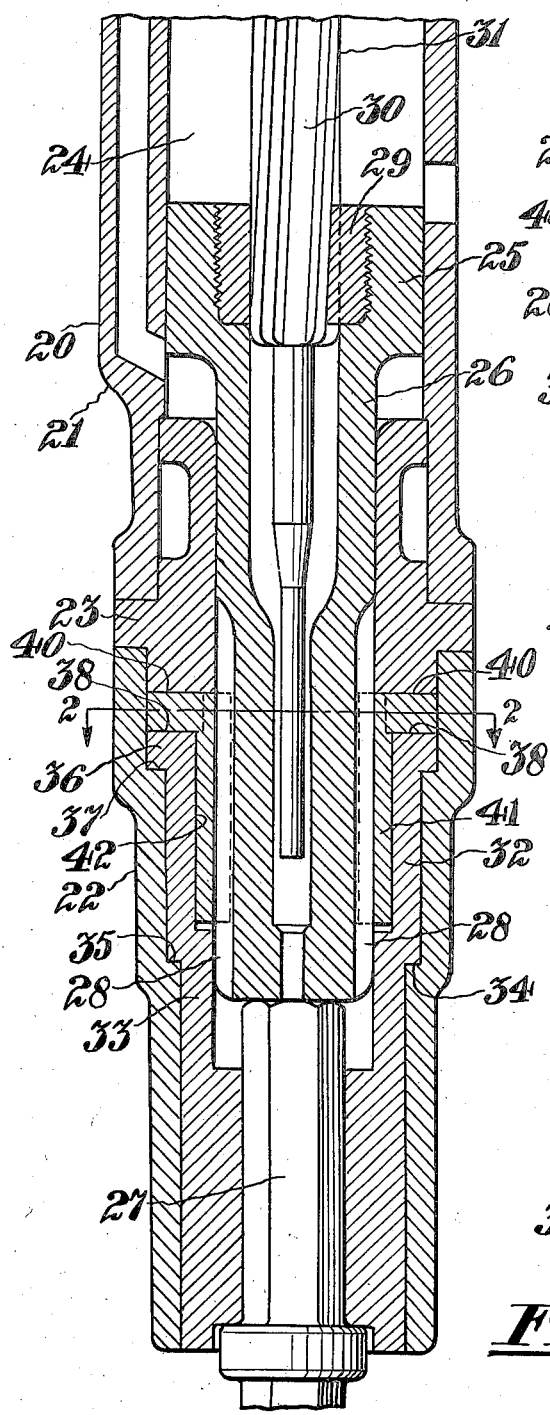
INVENTOR.
George W. Hulshizer
BY
HIS ATTORNEY.

Patented Oct. 27, 1936

2,058,988

UNITED STATES PATENT OFFICE 2,058,988

CHUCK MECHANISM FOR ROCK DRILLS

George W. Hulshizer, Stewartsville, N. J., assignor to Ingersoll-Rand Company, Jersey City, N. J., a corporation of New Jersey Application November 15, 1934, Serial No. 753,078

3 Claims. (Cl. 121—7)

This invention relates to rock drills, and more particularly to chuck mechanism for rock drills having rotation mechanism for rotating the working implement.

One object of the invention is to prevent binding between the rotary chuck parts and the stationary elements of the rock drill.

Another object is to facilitate the assembling and disassembling of the chuck parts.

Other objects will be in part obvious and in part pointed out hereinafter.

In the drawing accompanying this specification and in which similar reference numerals refer to similar parts, Figure 1 is an elevation, in section, of the front portion of a rock drill equipped with chuck mechanism constructed in accordance with the practice of the invention, Figure 2 is a transverse view taken through Figure 1 on the line 2—2, Figure 3 is a perspective view of a chuck nut, and Figure 4 is a similar view of a portion of a chuck.

Referring more particularly to the drawing, 20 designates a rock drill comprising a cylinder 21, a front head 22 and a front cylinder washer 23 interposed between the front head and the cylinder and extending into each to maintain them in coaxial alignment.

As an additional function, the front cylinder washer 23 serves as a closure for the front end of a piston chamber 24 in the cylinder 21. The piston chamber 24 contains a reciprocatory hammer piston 25 having a stem 26 which extends through the front cylinder washer 23 to strike against a working implement 27 in the front head 22.

In the forward portion of the stem 26 are flutes 28, and in the other end of the piston 25 is a fluted nut 29 which slidably engages the ribs 30 of a rifle bar 31 extending into the piston chamber 24. The rifle bar may be provided with the usual devices, such as spring-pressed pawls (not shown), for effecting a step-by-step rotary movement of the piston and thus of chuck mechanism 32, in the front head 22, wherewith the working implement 27 is interlocked.

The chuck mechanism comprises a chuck 33 having a shoulder 34 on its periphery to seat against a shoulder 35 in the front head 22. As a preferred construction, the chuck 33 is also provided with a flange 36 of which the front end seats against a shoulder 37 in the front head.

In the end surface of the chuck adjacent the front cylinder washer 23 are a series of radial notches 38, four in the present instance, which define lugs 39 for engagement with radial lugs 40 on the rear end of a chuck nut 41. The chuck nut 41 is disposed slidably into a recess 42 in the chuck 32 and the wall of the recess 42, like the periphery of the chuck nut 41, is of smooth cylindrical shape. The chuck nut 41 is preferably of slightly smaller diameter than the recess 42, so that it may readily enter the recess without undue friction, and has internal ribs 43 which extend into the flutes 28 to slidably interlock the piston with the chuck nut.

In the assembled positions of the chuck 32 and the chuck nut 41 the rear ends of these elements lie in the same transverse plane and directly in front of the front cylinder washer 23 which serves as an abutment for both and to retain the chuck nut within the chuck.

In practice, the present invention has been found to be a highly desirable arrangement for affixing the chuck nut to the chuck. The chuck nut may be assembled within the chuck by merely dropping it into the recess 42 and positioning the lugs 40 to enter the notches 38. The chuck nut will then be held against rotary movement with respect to the chuck by the interlocking lugs 40 and 39 and will be prevented from backing out of the chuck by the front cylinder washer. In consequence of this arrangement the chuck nut will not be whipped into a position to cause binding between itself and the front cylinder washer, as is frequently the case in structures wherein the chuck nut is threadedly connected to the chuck.

A further advantage of the present invention is that by employing smooth peripheral surfaces in the recess 42 and on the chuck nut 41 the danger of creating incipient fractures is entirely eliminated as is also the difficult and arduous task of separating the two after a prolonged period of usage.

I claim:

1. In a rock drill, the combination of a front head and a working implement extending into the front head, a chuck in the front head interlockingly engaging the working implement and having a notch in an end surface, a chuck nut in the chuck, and a lug on the chuck nut seated in the notch to prevent rotary movement of the chuck nut with respect to the chuck.

2. In a rock drill, the combination of a front head and a working implement extending into the front head, a chuck in the front head interlockingly engaging the working implement and having a clutch member on an end surface, a chuck nut in the chuck, and a clutch member on the chuck nut interlockingly engaging the first mentioned clutch member to prevent relative rotary movement between the chuck and the chuck nut.

3. In a rock drill, the combination of a front head and a working implement extending into the front head, a chuck rotatable in the front head and interlockingly engaging the working implement, said chuck having a smooth cylindrical recess, lugs on the end of the chuck, a chuck nut in the chuck, lugs on the periphery of the chuck nut to engage the first said lugs for preventing rotation of the chuck nut with respect to the chuck, and means for retaining the chuck nut within the chuck.

GEORGE W. HULSHIZER.